United States Patent

Anesi

[11] 4,052,791
[45] Oct. 11, 1977

[54] LAWN EDGE TRIMMER

[75] Inventor: Mario Anesi, Inverness, Ill.

[73] Assignee: Ansan Tool and Manufacturing Co., Inc., Harwood Heights, Ill.

[21] Appl. No.: 722,873

[22] Filed: Sept. 23, 1976

[51] Int. Cl.² .............................................. B26B 3/00
[52] U.S. Cl. ................................ 30/315; 30/DIG. 5; 172/13; 172/18
[58] Field of Search ................... 30/315, DIG. 5, 305, 30/297, 314; 172/13, 14, 15, 16, 17, 18

[56] References Cited

U.S. PATENT DOCUMENTS

| 226,746 | 4/1880 | Haskell | 30/315 |
|---|---|---|---|
| 339,359 | 4/1886 | Akins | 172/16 |
| 678,373 | 7/1901 | Blaser | 30/315 |
| 1,138,076 | 5/1915 | Brigance | 30/297 X |
| 1,427,733 | 8/1922 | Groff | 30/315 |
| 1,826,250 | 10/1931 | Jensen | 39/315 |
| 2,503,757 | 4/1950 | Morgan | 30/315 |
| 2,624,938 | 1/1953 | Davis | 30/315 X |
| 2,654,180 | 10/1953 | Redfield | 172/15 X |
| 2,779,262 | 1/1957 | Furr et al. | 30/297 X |
| 3,232,351 | 2/1966 | Wilson | 30/315 X |

FOREIGN PATENT DOCUMENTS

| 692,503 | 6/1940 | Germany | 30/297 |
|---|---|---|---|
| 905,081 | 9/1962 | United Kingdom | 172/13 |

*Primary Examiner*—Gary L. Smith
*Assistant Examiner*—J. T. Zatarga
*Attorney, Agent, or Firm*—Vogel, Dithmar, Stotland, Stratman & Levy

[57] ABSTRACT

A hand and foot-operated lawn edge trimming tool includes a pair of platform sections each having a flat base and an attachment flange depending therefrom, and a flat blade clamped by fastening means between the attachment flanges and extending downwardly therebeneath, the clamped-together sections forming a platform having a ribbed foot-receiving upper surface terminating at the front end thereof in an upstanding toe-retaining wall. Stiffening ribs extend laterally outwardly from the attachment flange and cooperate to define recesses for the fastening means, one of the ribs receiving therethrough a transversely extending bolt for pivotally coupling a pair of handle brackets to the platform adjacent to the front end thereof, the handle brackets being secured to an upstanding handle and cooperating to bridge the foot of a user standing on the platform. The upper edge of the blade extends rearwardly beyond the rear end of the platform.

1 Claim, 6 Drawing Figures

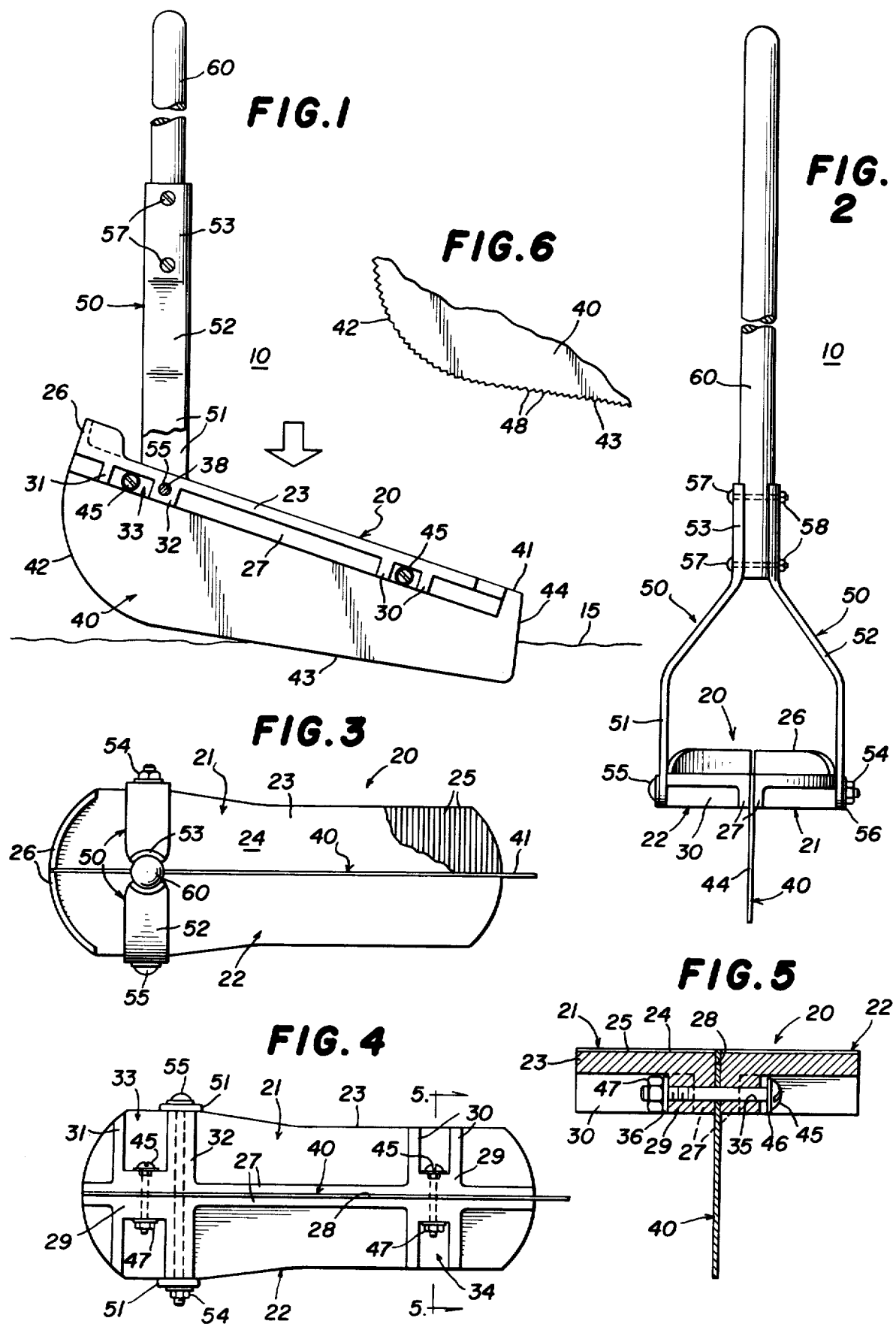

LAWN EDGE TRIMMER

BACKGROUND OF THE INVENTION

The present invention relates to a lawn edging tool and, more particularly, to a hand and foot-operated tool which is driven into the ground by the weight of the user standing upon the tool.

Lawn edging or trimming tools of this type have been disclosed in the prior art, for example, in U.S. Pat. No. 2,503,757 issued to B. G. Morgan on Apr. 11, 1950, and in U.S. Pat. No. 2,594,508, issued to E. R. Sitton on Apr. 29, 1952. These prior art tools have guiding and maneuvering handles and foot-receiving surfaces on which a user can stand to drive the tool into the ground. The Morgan patent discloses a two-piece platform with a blade clamped therebetween and a handle pivotally coupled to the platform. In the Morgan device, the handle bridges the user's toe which, in use, may slide forwardly and be jammed under the handle, which might result in injury to the user's instep or ankle, or could result in loss of balance. At the least, such slipping would hinder the proper control of the tool.

Furthermore, the Morgan platform is formed of relatively thin pieces of wood which are highly susceptible to cracking or splitting, particularly along the high-stress areas where the fastening bolts pass through the platform.

SUMMARY OF THE INVENTION

In the present invention, there is provided an improved hand and foot-operated lawn edge trimming tool which includes a foot-receiving platform having a blade depending therefrom, and a handle bridging the foot of the user and pivotally coupled to the platform, but which is designed to prevent slippage of the user's foot along the platform.

More particularly, it is an important feature of the present invention that the platform includes a nonslip surface and a retaining wall at the front end thereof to limit movement of the user's foot therealong.

It is another important feature of this invention that the platform is formed of metal and includes reinforcing portions to provide a strong and safe tool.

It is another important feature of this invention that the rear edge of the blade is visible at all times by the user so as to insure accuracy of placement of the blade in use.

These advantages are achieved and it is an important object of this invention to provide these features in a lawn edge trimmer comprising a platform having an upper surface adapted to receive the foot of a user thereon, a knife blade secured to the platform and extending downwardly therefrom substantially perpendicular to the upper surface thereof, the upper edge of the blade extending rearwardly beyond the rear end of the platform so as to be clearly visible by a user, a toe-retaining wall extending upwardly from the upper surface of the platform at the front end thereof for engagement with the toe end of a user's foot to limit movement of the foot forwardly along the upper surface, and handle means including a clevis-shaped lower end pivotally connected to the platform adjacent to the front end thereof and adapted in use to receive thereunder the foot of a user and an upper end accessible to the hands of a user, whereby the knife blade may be guided by the handle and may be driven downwardly into the lawn by the weight of the user standing on the platform.

Further features of the invention pertain to the particular arrangement of the parts of the lawn edge trimmer whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 1 is a side elevational view of a lawn edge trimming tool constructed in accordance with and embodying the features of the present invention, with portions of the handle broken away;

FIG. 2 is a rear elevational view of the lawn edge trimming tool of FIG. 1;

FIG. 3 is a top plan view of the lawn edge trimming tool illustrated in FIG. 2, and also illustrating the ribbed foot-receiving surface;

FIG. 4 is a bottom plan view of the lawn edge trimming tool of FIG. 2;

FIG. 5 is a view in vertical section taken along the line 5—5 in FIG. 4; and

FIG. 6 is a fragmentary side elevational view of one embodiment of blade which can be used with the tool of the present invention.

DESCRIPTION OF THE PREFERRED EMBDOIMENT

Referring now more particularly to the drawings, there is illustrated a lawn edge trimming tool, generally designated by the numeral 10, for cutting into the ground 15 along the edge or border of a lawn to provide an even border. The tool 10 includes a platform, generally designated by the numeral 20, which is formed of a pair of platform sections 21 and 22 which are constructed as mirror images of each other, wherefore only one of these sections will be described in detail. Preferably, each of the platform sections 21 and 22 is integrally formed of metal as, for example, a metal casting, the section including an elongated flat base or pedal plate 23 having a foot-receiving upper surface 24 which is preferably provided with a plurality of transversely extending ribs 25, the crests of which lie substantially in a common plane. Integral with the baseplate 23 at the forward end thereof and extending upwardly therefrom is an arcuate toe-retaining wall section 26. Integral with the baseplate 23 and extending downwardly therefrom along the entire inner side edge thereof in attachment flange 27 having a flat planar abutment surface 28 which is disposed substantially perpendicular to the foot-receiving surface 24.

The attachment flange 27 is provided adjacent to the front and rear ends thereof with laterally thickened portions 29, each having formed therethrough a bore, the axis of which extends transversely of the baseplate 23 and substantially parallel thereto. Integral with the rear one of the thickened portions 29 and with the underside of the baseplate 23 and extending transversely thereof to the outer edge thereof are two longitudinally spaced-apart stiffening ribs 30 which cooperate to define therebetween a recess 34. In like manner, respectively integral with the front and rear edges of the forward one of the thickened portions 29 and with the underside of the baseplate 23 and extending transversely thereof to the outer edge thereof are stiffening ribs 31 and 32, which cooperate to define therebetween a recess 33. The rib 32 is substantially thicker than the rib 31 and has formed therethrough a bore 38, the axis of which extends transversely of the baseplate 23 and is substantially parallel thereto.

The tool 10 is also provided with a flat broad metal blade, generally designated by the numeral 40, which includes an elongated straight upper edge 41, an arcuate front edge 42, a straight bottom edge 43 disposed at an acute angle to the upper edge 41, and a straight rear edge 44 which preferably forms an obtuse angle with the upper edge 41. It will be appreciated that this configuration provides a relatively broad front end and a relatively narrow rear end for the blade 40. It will also be appreciated that the bottom edge 43 and front edge 42 of the blade 40 may be sharpened to a knife edge and, if desired, may be provided with a serrated edge 48, as illustrated in FIG. 6.

In use, the platform sections 21 and 22 are disposed in side-by-side relationship with the blade 40 therebetween, the abutment surfaces 28 of the attachment flanges 27 being disposed in facing parallel relationship and respectively contacting the opposite sides of the blade 40 along the upper margin thereof, so that the upper edge 41 of the blade 40 and the foot-receiving surfaces 24 of the platform sections 21 and 22 are all substantially coplanar. When thus arranged, the bores 35 and 38 of the platform section 21 are respectively in registry with the bores 35 and 38 of the platform section 22, with the toe-retaining wall sections 26 abutting to form a continuous toe-retaining wall, and with the rear end of the upper edge 41 of the blade 40 extending rearwardly a predetermined distance beyond the rear ends of the pedal plates 23, and with the foot-receiving surfaces 24 cooperating to define the unitary platform. The blade 40 is clamped between the platform sections 21 and 22 in this configuration by means of suitable fasteners such as bolts 45 which respectively extend through the bores 35 at the front and rear ends of the platform 20 and cooperate with washers 36 and nuts 37 securely to hold the parts together. When thus assembled, the blade 40 extends downwardly well below the bottom edges of the attachment flanges 27.

The tool 10 is also provided with a pair of handle brackets, each generally designated by the numeral 50, and constructed as mirror images of each other. Each of the handle brackets 50 includes a straight bottom portion 51 integral at the upper end thereof with an inwardly inclined portion 52, which is in turn integral at the upper end thereof with an upwardly extending part-cylindrical portion 53. Each of the straight portions 51 is provided adjacent to the lower end thereof with an aperture therethrough which is disposed in use in alignment with the adjacent end of the bore 38 at one side edge of the platform 20 for receiving therethrough a bolt 55 which cooperates with a nut 54 and washer 56 pivotally to secure the handle brackets 50 to the platform 20. The part-cylindrical portions 53 cooperate to receive therebetween the lower end of a handle 60, which may be formed of wood and is fixedly secured to the part-cylindrical portions 53 by the means of bolts 57 and nuts 58.

The length of the straight portions 51 and inclined portions 52 of the handle brackets 50 is such that they cooperate in use to bridge the front portion of a user's foot when the foot is placed upon the platform 20 with the toe abutting the toe-retaining wall 26. In utilizing the tool 10, the rear portion of the bottom edge 43 of the blade 40 is placed on the ground at the desired location and the user then places his foot on the platform 20 in the manner described above and stands down on it, his weight driving the blade 40 into ground. As the blade 40 pivots downwardly into the ground, the handle 60 is grasped by the user and can pivot back toward him about the axis of the bolt 55, so that the user can maintain his balance and maintain control of the tool 10 while he moves his weight forwardly to drive the forward end of the blade 40 into the ground.

It will be appreciated that the ribs 25 and the toe-retaining wall 26 on the platform 20 cooperate to prevent the user's foot from sliding forwardly along the platform 20, thereby preventing his foot from being jammed beneath the handle brackets 50. The rear end of the upper edge 41 of the blade 40 can always be seen by the user so that he can accurately place the blade 40 into the ground. The metal construction of the platform 20 affords a rigid, durable, heavy-duty construction, the strength of which is enhanceed by the stiffening ribs 30, 31 and 32, the recesses 33 and 34 serving to accommodate and protect the ends of the bolts 45.

From the foregoing, it can be seen that there has been provided an improved lawn trimming tool which is of simple and economical construction and is, at the same time, easy to use and quite effective.

More particularly, there has been provided an improved hand and foot-operated lawn trimming tool which includes means for effectively preventing slippage of the operator's foot along the tool platform.

There has also been provided an improved lawn trimming tool of the character described, which is of rugged heavy-duty construction.

While there has been described what is at present considered to be the preferred embodiment of the present invention, it will be understood that various modifications may be made therein, and it is intended to cover in the appended claims all such modifications as fall within the true spirit and scope of the invention.

What is claimed is:

1. A lawn edge trimmer comprising a pair of platform sections; each of said platform sections being integrally formed of a single piece of metal and including a substantially flat base having a foot-receiving surface thereon and an attachment flange depending from said base along one side edge thereof, said foot-receiving surface having laterally-extending grooves formed therein, two pairs of longitudinally spaced-apart and laterally-extending ribs integral with said attachment flange and extending laterally therefrom to the other edge of said base, said attachment flange including thickened portions respectively disposed between said pairs of ribs and projecting laterally toward said other edge of said base and each being provided with a laterally-extending aperture therethrough, the ribs of each pair or ribs cooperating to define therebetween a recess extending from the corresponding thickened portion of said attachment flange to said other edge of said base, one of said ribs being enlarged and provided with a bore extending axially therethrough laterally of said base; a knife blade disposed in use between said attachment flanges and extending therebeyond in a direction away from said foot-receiving surfaces and being provided with openings therethrough respectively alignable with said bores and apertures, said blade being coterminous with said platform sections at the front ends thereof and extending rearwardly beyond the rear ends of said platform sections; fastening members respectively extending through aligned ones of said apertures and openings for securely clamping said blade between said attachment flanges with said foot-receiving surfaces being substantially coplanar for forming a platform and with said toe-retaining wall sections cooperating to form a toe-retaining wall for engagement with the toe end of a user's foot; and handle means including a clevis-shaped lower end having holes therethrough respectively alignable with the outer ends of said bores through said enlarged ribs of said platform sections; and pivot means extending through said holes and said bores for pivotally connecting said handle means to said platform section bases, said handle means having an upper end accessible to the hands of a user with said clevis-shaped lower end being adapted in use to receive thereunder the foot of the user, whereby said knife blade may be guided by said handle means and may be driven downwardly into the lawn by the weight of a user standing on said platform.

* * * * *